April 17, 1962  E. B. ODENKIRK  3,029,558
SOIL FUMIGATING BLANKET
Filed March 1, 1960
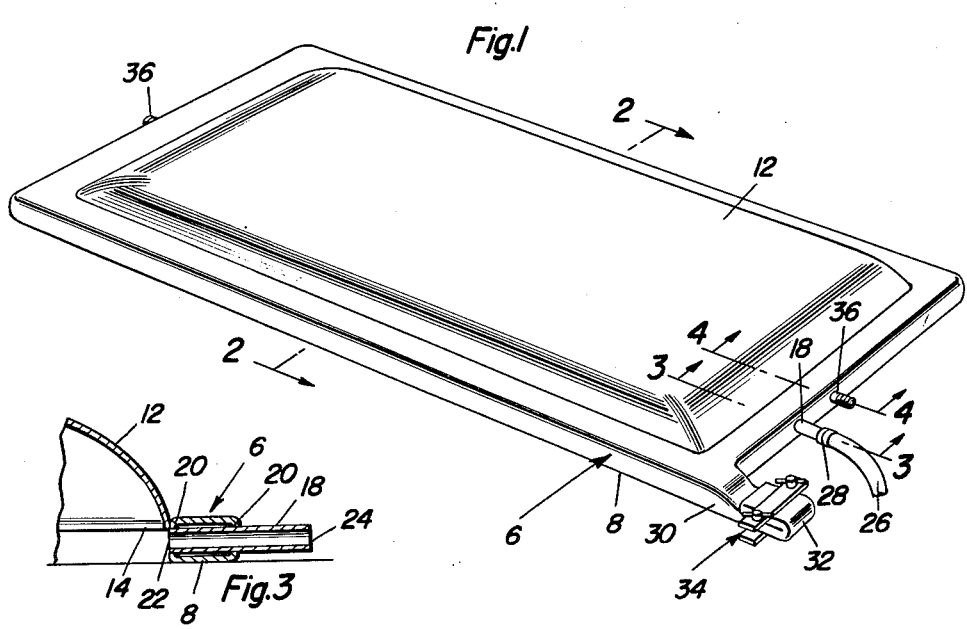
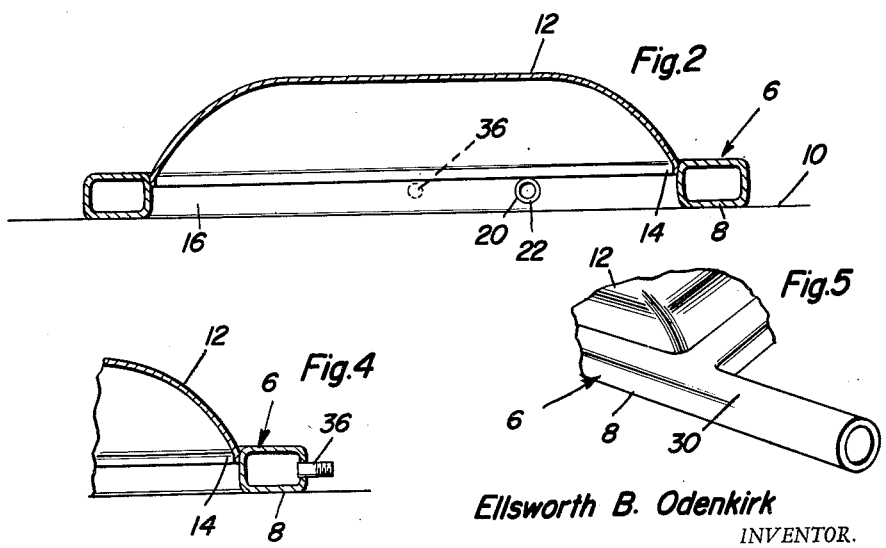
Ellsworth B. Odenkirk
INVENTOR.
BY Clarence A. O'Brien
and Harvey B. Jacobson
Attorneys

United States Patent Office 3,029,558
Patented Apr. 17, 1962

3,029,558
SOIL FUMIGATING BLANKET
Ellsworth B. Odenkirk, 536 W. Evanston Circle,
Fort Lauderdale, Fla.
Filed Mar. 1, 1960, Ser. No. 12,077
4 Claims. (Cl. 47—1)

The present invention relates to an improved device for subjecting a prescribed and limited amount of soil to a simple but practical fumigating procedure with a view toward conditioning the soil for more effectual utilization indoors, for example in a hot house or alternatively for outdoors use.

Stated otherwise, the concept has to do with a soil fumigating blanket, that is, a simple and expedient collapsible sheet material cover which is expressly designed and adapted to be efficaciously used in minimizing soil contamination.

The idea of processing soil by fumigating it, steaming it and otherwise handling it is, of course, not new. However, the appliances and implements employed have usually been regarded as comparatively crude and objectionable in that considerable hand labor is involved in handling the task. It is generally well known that virtually all soil is charged with weed seeds and insects of one type or another. Also, the objective in fumigating is to substantially or effectually sterilize the soil so that when used for propagating plants it will be substantially free of undesirable seeds and destructive insects.

It is also a matter of common knowledge that much plant material is grown in containers and it is important to fumigate soil so as to eliminate any possibility of insect damage and to prevent weed seeds from developing and growing since in due time a major labor problem would be present hoping to destroy the weeds from the aforementioned containers.

As persons conversant with this line of endeavor are unquestionably aware, it is current practice in conditioning soil to place the same on a concrete slab or perhaps spread it on the ground. It is then covered with a plastic sheet. The edges of the plastic cover are then usually covered over with dirt to form a make-shift seal, that is, between the edges and the ground so that when the fumigant (usually methyl bromide or an equivalent product) is released it will not leak out to any undesirable extent. The cover is customarily left over the soil until the fumigant has fully permeated the soil.

The instant blanket will no doubt advance the art since all that is necessary to do is to apply the blanket over the soil, turn on the water to load and weigh down the water jacket. This automatically seals the marginal edges of the blanket and the flexible diaphragm portion is inflated and traps the fumigating gas and subjects the soil therebeneath to the effects of the gas.

In carrying out the invention a simple and reliable adaptation has been evolved and produced. When properly used it will reduce manual laborious effort. It will save labor and valuable time in removing the soil that had to be piled up along the edges of the cover under the old method. In addition, water or an equivalent weight medium which is used in loading and weighing down the improved blanket can be drained off to an out-of-the-way area so that there will be no problem insofar as this aspect of the concept is concerned.

Stated otherwise, it is believed that when the instant invention is more extensively manufactured and commercially brought into widespread use it can be shown that it not only saves time and labor, it effectually fumigates and conditions the coil with which it is associated. It will make possible the removal and drainage of water to an out-of-the-way place to avoid pooling and the formation of undesirable muddy areas. A tight-seal with the ground or other foundation is effectually attained in a simple and practical manner. The blanket can be washed off and rolled up and used over and over and will therefore fulfill the purposes for which the invention is intended.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a view in perspective of the novel soil fumigating and treating blanket showing how it is constructed and used;

FIG. 2 is a cross section on the line 2—2 of FIG. 1 looking in the direction of the arrows;

FIGS. 3 and 4 are sections on the lines 3—3 and 4—4, respectively, of FIG. 1, these being fragmentary views in section and elevation; and FIG. 5 is a fragmentary perspective view of a corner portion illustrating the drainage nipple or neck.

With reference now to the views of the drawings the base comprises an inflatable and deflatable generally rectangular frame 6. This frame is, when inflated, in the form of an endless conduit having a flat bottom 8 to rest on the ground or other surface 10 on which the soil to be treated (not shown) is spread. The sheet material which forms the blanket proper is thin but nevertheless sufficiently tough to serve the purposes for which it is intended. This part might perhaps be described as a diaphragm-like sheet which functions to form a hood-like trap and it is denoted by the numeral 12. The outer marginal edge portions 14 are vulcanized or otherwise sealed to the inner peripheral upper edge portions 16 of the base or frame 6. As seen in FIG. 3 a tubular adapter member is provided and this is denoted at 18 and has portions fitting into holes 20 provided therefor in the inner and outer peripheral walls of the frame 6. A suitable fluid-tight joint must, of course, be provided between the parts and also the inner end 22 is arranged to discharge the fumigating gas into the gas trapping space as is no doubt evident from FIG. 3. The projecting end portion 24 serves to permit the gas conducting hose or line 26 to be clamped or otherwise connected thereto as at 28 in FIG. 1. At one corner portion or elsewhere an integral nipple 30 is provided. As best shown in FIG. 5, this nipple may be doubled upon itself (FIG. 1) as at 32 and a clamp 34 applied to close the discharge end of the nipple. However, by removing the clamp the nipple "springs" out to a water emptying or draining position and, if desired, an additional hose could be provided for connection or this part 30 should be sufficiently long to carry the drain water to a desired distant point. At either one end or anywhere else additional hose connecting fittings 36 are provided. An ordinary garden hose (not shown) may be connected communicatively with the space of the inflatable frame and the frame then charged with water so that it becomes comparatively rigid and heavy. The degree of heaviness will determine the effectiveness of the seal, that is, the seal between the bottom surface 8 and the surface of the foundation 10 as evidenced in FIG. 2.

As before mentioned, with this device all that is necessary for one to do is to roll it out and spread it over the soil which is to be treated and to turn the water on and load the frame-like water jacket 6. This provides the desired weight and automatically seals the edges of the blanket so that the blanket becomes a satisfactory trap for the fumigating gas. When the job is completed all that is then necessary is to drain out the water, fold or roll up the blanket and store it away. The weight means used for loading the jacket or frame 6 need not be confined to water. One might resort to the use of other liquids or perhaps even to sand.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is a follows:

1. A soil fumigating blanket comprising a flexibly pliant gas-proof blanket designed and adapted to span and cover an accumulated batch of plant bed soil which has been prepared and spread on a selected flat area of the ground, said blanket having a circumscribing frame attached to marginal edges of the blanket, said frame being in a plane below the plane of the blanket and being of endless hollow tubular form rectangular in cross-section and provided with at least one hose adapter which permits attachment of a hose for the purpose of loading the hollow space of the frame with fluid and thus providing the weight necessary to retain the blanket in a given usable position with the edges of the flat bottom side of the frame in sealing engagement with the ground surrounding the accumulated soil, said frame being also provided with an attached closable nipple through the medium of which the fluid may be drained from the hollow space, and being further provided with an integrally mounted adapter tube open at its ends, the inner end opening through an inner periphery of the frame, the outer end projecting beyond the outer periphery of the frame to permit a gas delivery hose to be connected to said adapter tube.

2. The structure as defined in claim 1 and wherein said adapter tube is of a length greater than the cross-section of that portion of the frame with which it is connected, being also of a cross-section less than the cross-section of the hollow portion of the frame, said hose adapter, adapter tube and fluid draining nipple all being adjacent to each other located at one end of the frame.

3. For use in treating and sterilizing a batch of plant bed soil which has been suitably prepared and distributively spread on a surface with a view toward minimizing the presence therein of weed seed and damaging insects, a portable collapsible soil fumigating cover means comprising: a flexibly plant gas-proof blanket of a size that it may be adequately spread over the soil to properly cover the same, and surface contacting blanket-edge holddown and sealing means cooperable with and carried by the marginal edges of said blanket, said holddown means comprising an outstanding bordering frame completely circumscribing the entire marginal edge portions of said blanket and having a substantially flat bottom for flatwise engagement with the surface portions on which it is adapted to reside and which is adapted to be loaded with and restrictively confine a prescribed amount of readily applicable and removable weight medium and thus rendered of prerequisite predetermined heaviness to rest firmly on the surface and to effect a leak-proof blanket-edge sealing result, said frame being of non-circular tubular form and adapted to be filled with fluid by way of a fluid filling adapter carried by the frame, said frame being further provided with a communicable drainage nipple projecting in a plane common with and beyond the outer peripheral portion of the adjacent portion of the frame and which is of a length that it may be doubled upon itself, thus closed and held in its closed state by a readily attachable and detachable clamp.

4. The structure defined in claim 3 and wherein said holddown frame is also provided with an integral adapter providing a connection for a gas feeding hose, said adapter being embodied in the frame and having one end opening through the inner periphery of the frame to safely deliver the gas beneath the blanket and within the sealed confines of the frame for utilization in the gas pocketing space between the soil and blanket spanning the soil.

References Cited in the file of this patent

UNITED STATES PATENTS

| | | |
|---|---|---|
| 1,518,434 | Klein | Dec. 9, 1924 |
| 2,323,629 | Spanel | July 6, 1943 |
| 2,443,440 | Alvarez | June 15, 1948 |
| 2,883,676 | Kwake | Apr. 28, 1959 |
| 2,910,994 | Joy | Nov. 3, 1959 |

OTHER REFERENCES

"Methods of Weed Control" (Helgeson), published by Food and Agriculture Organization of the United Nations (Rome, Italy) 1957; pages 47, 48 49 relied on. (Copy in Scientific Library at SB 611.H4. Another copy in Division One at 47-Weed Killing.)